United States Patent [19]

Tsai et al.

[11] Patent Number: 4,973,641
[45] Date of Patent: Nov. 27, 1990

[54] POLYSACCHARIDE GRAFT COPOLYMERS CONTAINING REACTIVE AMINOETHYL HALIDE GROUP

[75] Inventors: John J. Tsai, Belle Mead; Eric A. Meier, Hamilton Square, both of N.J.

[73] Assignee: National Starch and Chemical Investment Holding Corporation, Wilmington, Del.

[21] Appl. No.: 273,394

[22] Filed: Nov. 18, 1988

[51] Int. Cl.$^5$ .................... C08G 83/00; C08B 11/193; C08B 31/08; D21H 11/00

[52] U.S. Cl. .................... 527/312; 527/313; 527/314; 536/43; 536/44; 536/50; 536/124; 162/164.6; 162/177

[58] Field of Search .................... 527/312, 313, 314; 536/43, 44, 50, 124; 162/164.6, 177

[56] References Cited

U.S. PATENT DOCUMENTS

| | | | |
|---|---|---|---|
| 3,809,664 | 5/1974 | Fanta et al. | 527/311 |
| 3,976,552 | 8/1976 | Fanta et al. | 527/311 |
| 4,131,576 | 12/1978 | Iovine et al. | 527/311 |
| 4,278,573 | 7/1981 | Tessler | 527/312 |
| 4,330,443 | 5/1982 | Rankin | 527/312 |
| 4,464,523 | 8/1984 | Neigel et al. | 527/312 |
| 4,690,996 | 9/1987 | Shih et al. | 527/312 |
| 4,719,272 | 1/1988 | Tsai et al. | 576/238.22 |
| 4,737,156 | 4/1988 | Tambor et al. | 8/490 |

OTHER PUBLICATIONS

"Handbook of Water-Soluble Gums and Resins", edited by R. L. Davidson, McGraw-Hill Book Co., 1980, Chapter 22, pp. 22-47 to 22-54.

"Starch: Chemistry and Technology", second edition, edited by R. L. Whistler et al., Academic Press, Inc., 1984, pp. 403-410.

Wright, J. B. et al., J. American Chem. Soc., "Histamine Antagonists, VII Phenothiazine Derivatives", vol. 72, 1950, pp. 3556-3559.

*Primary Examiner*—Nathan M. Nutter
*Attorney, Agent, or Firm*—Eugene Zagarella, Jr.; Edwin M. Szala

[57] ABSTRACT

A polysaccharide graft copolymer containing a reactive aminoethyl halide group is provided, said copolymer represented by:

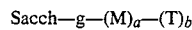

where Sacch is a polysaccharide base substrate, M is a repeating unit of the formula:

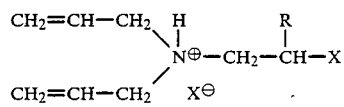

where X is halogen and R is hydrogen or alkyl of 1 to 2 carbons; T is an ethylenically unsaturated comonomer, a is at least 1 and b is 0 or 1 or more, with the total of a and b being at least 2.

Another embodiment provides preparing this graft copolymer by reacting the monomer in a system that is maintained at a pH level of below 7 to prevent premature reaction of the halogen on the aminoethyl halide group during the grafting procedure.

22 Claims, No Drawings

POLYSACCHARIDE GRAFT COPOLYMERS CONTAINING REACTIVE AMINOETHYL HALIDE GROUP

BACKGROUND OF THE INVENTION

This invention relates to novel polysaccharide graft copolymers which contain a reactive aminoethyl halide group and to the method for their preparation. It also relates to the use of the aminoethyl halide-containing graft copolymers as strength agents in paper.

Graft copolymers of polysaccharides such as starches, cellulose and gums are well known in the literature. Various graft copolymers and the methods of preparation are disclosed in "Starch: Chemistry and Technology", second edition, edited by R. L. Whistler et al., Academic Press, Inc., 1984, pp. 403–410 and "Handbook of Water-Soluble Gums and Resins", edited by R. L. Davidson, McGraw-Hill Book Co., 1980, chapter 22, pp. 22-47 to 22-54.

Methods of preparing graft copolymers include polymerizations in water, in water-solvent mixtures and in the dry state, and may be initiated by mechanical, chemical and irradiative techniques. Such methods are typically disclosed in U.S. Pat. Nos. 3,809,664; 3,976,552; 4,131,576; 4,330,443 and 4,690,996.

Some of the monomers which have been used to prepare graft copolymers include acrylic monomers disclosed in U.S. Pat. No. 4,330,443; water soluble monomers such as acrylamide disclosed in U.S. Pat. No. 4,131,576; cationic monomers such as N, N-diallyl-N, N-dialkyl ammonium halides and other salts disclosed in U.S. Pat. Nos. 4,464,523 and 4,737,156 and cationic copolymers of N, N'-methylenebisacrylamide and polyamines disclosed in U.S. Pat. No. 4,278,573.

It is an object of this invention to provide a polysaccharide graft copolymer which contains a reactive aminoethyl halide group that is available for later or post-reaction and thus useful in many applications such as additives in papermaking wherein they provide improved retention and strength properties.

SUMMARY OF THE INVENTION

The present invention provides a polysaccharide graft copolymer containing a reactive aminoethyl halide group. More particularly, the graft copolymer may be represented schematically as:

Sacch-g-(M)$_a$-(T)$_b$  (I)

where Sacch is a polysaccharide base substrate, g indicates there is a grafted chain on the substrate, M is a repeating unit derived from a monomer unit having the formula:

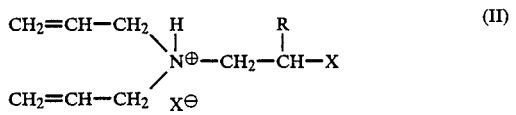

where X is a halogen and R is hydrogen or an alkyl group of 1 to 2 carbons, T is a repeating unit of an ethylenically unsaturated comonomer that is suitable for graft polymerization, a is at least 1, and b is 0 or 1 or more, with the total of a and b being at least 2.

Another embodiment of this invention involves the method of preparing the graft copolymers (I) wherein the polysaccharide substrate is polymerized with a monomer containing a reactive aminoethyl halide group (II), in the presence of a free radical catalyst, while maintaining the system at a pH level below 7 to prevent premature reaction of the halogen on the aminoethyl halide group during the grafting procedure.

DETAILED DESCRIPTION OF THE INVENTION

The polysaccharide substrates suitable for use in the practice of this invention include starches, starch conversion products derived from any source and starch derivatives; cellulose and cellulose derivatives; and various plant gums.

Starches, including those derived from corn, potato, wheat, rice, sago, tapioca, waxy maize, sorghum and amylose, as well as the conversion products and derivatives thereof, are the preferred substrates due to their cost and availability. For certain end uses, derivatized starches, such as ethers and esters, have been found effective. In particular, starches derivatized with allyl glycidyl ether have shown advantageous properties in making graft copolymers for use as additives in papermaking in accordance with this invention.

The monomer used in preparing the graft copolymers of this invention has a polymerizable diallyamino structure and a reactive aminoethyl halide moiety and is represented by the following formula:

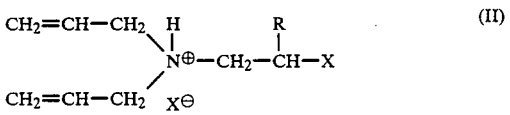

where X is a halogen which may be chlorine, bromine or iodine, preferably chlorine or bromine and more preferably chlorine, and R is H or alkyl of 1 to 2 carbons, preferably H or methyl and more preferably hydrogen. Additionally, the monomer may contain one or more other substituents, such as alkyl groups and a longer chain R group, on either the allyl groups or the ethyl halide moiety, as long as the monomer remains polymerizable and suitable for graft polymerization. The monomer (II) may be prepared in a sequential reaction wherein (1) diallylamine is reacted with a suitable 1,2 epoxide such as ethylene oxide, propylene oxide, or butylene oxide, followed by (2) reaction with thionyl halide. This method of preparation is disclosed by J. B. Wright et al. in an article entitled "Histamine Antagonists. VII. Phenothiazine Derivatives" J. Amer. Chem. Soc., 72, pp. 3556–3559, 1950. An alternate preparation technique involves reaction of aminoethanol with allyl chloride followed by replacement of the hydroxy group with halogen using reagents well known in the art, including thionyl halides and tri- and penta-valent phosphorus halides.

While the polysaccharide graft copolymers may be prepared using only the diallylaminoethyl halide monomers (II), other ethylenically unsaturated comonomers that are polymerizable and suitable for graft polymerization may be included, if desired. Suitable comonomers will depend on the desired application as well as the particular process by which the graft copolymer is prepared. Typical comonomers that may be used include: acrylic and methacrylic acid, acrylamide, methacrylamide, acrylonitrile, vinyl pyrrolidone, styrene sulfonate salts, alkyl or hydroxyalkyl acrylates and methacrylates. Acrylamide is a preferred comonomer.

The method of preparing the polysaccharide graft copolymers of this invention involves the free radical polymerization of the diallyl aminoethylhalide monomer (II) with a polysaccharide base substrate while maintaining the system at a pH level on the acid side or below 7, to prevent premature reaction of the halogen on the aminoethylhalide group during the polymerization reaction. As indicated earlier, various methods for preparing graft copolymers of polysaccharides are known in the art, including free radical initiation with chemicals, high energy radiation or heat, in solution, suspension, emulsion or other mediums. While any of these methods can generally be used in carrying out the graft polymerization of this invention, the additional and essential step of maintaining the system under neutral or slightly acidic conditions is required to retain the reactive halide group, e.g. chloride, for later reaction as desired. Therefore, to prevent premature reaction of the halide, the pH of the system should be maintained below 7. More particularly, the pH of the system is maintained at from about 1 to about 6 and preferably from about 2 to 5. When it is desired to initiate or trigger the reactivity of the halide group, the pH can be adjusted to the alkaline side.

Typically, the graft polymerization may involve an inverse emulsion wherein the polysaccharide, monomer, and optionally comonomer are emulsified in an oil phase containing an emulsifying agent and polymerized therein by heating under free radical conditions. This method is disclosed in U.S. Pat. No. 4,690,996 and such disclosure is incorporated herein by reference. Another method used to carry out the graft polymerization of this invention involves solution polymerization wherein an aqueous solution containing the saccharide, monomer and optionally comonomer, are heated in the presence of a free radical initiator.

Free radical yielding initiators useful herein in the polymerization of ethylenically unsaturated monomers, include but are not limited to initiators such as benzoyl peroxide, lauryl peroxide, potassium persulfate; and redox couples such as tertiary butyl hydroperoxide and sodium metabisulfite, and the like. The actual initiator or catalyst concentration necessary to generate sufficient free radicals, so as to effect polymerization, depends upon the particular reaction conditions such as temperature, time, starting materials and the amounts thereof and the free radical initiating temperature of the initiator. Accordingly, the initiator level can vary widely, advantageously ranging in amounts between about 0.002 to 3% by weight of the monomeric components of the graft.

Reaction temperatures of typically between about 40° and 75° C. are used with free radical yielding initiators. Within such a temperature range, conversion is substantially complete in from one-half hour to several days, depending upon monomer and reaction variables.

The reaction is generally carried out at atmospheric or substantially atmospheric pressure. However, superatmospheric pressure is advantageously used when volatile ingredients are involved.

The polysaccharide may be used in any form, so long as that form renders the polymer molecules available for graft copolymerization. For example, in one embodiment an acid converted starch derivative is gelatinized by cooking in water to yield an aqueous starch dispersion. In such a dispersion, the starch molecules are more readily accessible for graft copolymerization than are the starch molecules of an aqueous starch granule slurry.

The amount of polysaccharide substrate may vary from about 1 to 99%, preferably from about 5 to 95% and more preferably from about 30 to 70% by weight of the final graft copolymer.

The amount of monomer may vary from about 99 to 1%, preferably from about 50 to 2% and more preferably from about 20 to 5% by weight of the final graft copolymer. The amount of comonomer used will also vary from 0 to 95%, preferably from about 0 to 50%, by weight of the final graft copolymer.

It will be recognized by those skilled in the art that various solvents, surfactants, buffers and other additives conventionally used, may generally be incorporated into the methods as defined herein. It is further noted, that final graft copolymer structure as represented schematically by (I), will not be a simple graft copolymer arrangement, but will include some crosslinking, copolymerizing and cyclopolymerizing of the diallyl moieties and other components in the system. This is expected and the degree of each will vary depending on the conditions, components and amounts used.

In one embodiment of this invention, the graft copolymers (I) are used as strength additives in papermaking. As used herein, the term "paper" includes sheet-like masses and molded products made from fibrous materials which may be derived from natural cellulose sources, as well as from synthetics such as polyamides, polyesters, and polyacrylic resins, and from material fibers such as asbestos and glass. In addition, paper made from combination of cellulosic and synthetic materials are applicable herein. Paperboard is also included within the term "paper".

The graft copolymers of this invention may be added to the paper pulp at any point in the papermaking process prior to the ultimate conversion of the wet pulp into a dry web or sheet. Thus, for example, they may be added to the pulp while the latter is in the hydropulper, beater, various stock chests or headbox. The graft copolymer may also be sprayed onto the wet web.

The proportion of the graft copolymer to be incorporated into the paper pulp may vary in accordance with the particular pulp involved and the properties desired, e.g. wet strength or dry strength. In general, about 0.1 to 10% and preferably about 0.25 to 5% of the graft copolymer, based on the dry weight of the pulp, will be used. Within the preferred rang®the precise amount which is used will depend on the type of pulp being used, the specific operating conditions, the particular end use for which the paper is intended, and the particular property to be imparted. The use of amounts greater than 5%, based on the dry weight of the pulp is not precluded, but is ordinarily unnecessary in order to achieve the desired results.

In the following examples, which are merely illustrative of the various embodiments of this invention, all parts and percentages are given by weight and all temperatures are in degrees Celsius unless otherwise noted. The term "water fluidity" (WF) as used herein, is a measure of the degree of degradation of the starch and is measured using a Thomas Rotational Shear-Type Viscometer (manufactured by Arthur H. Thomas Co., Philadelphia, PA) in accordance with standard procedures such as are disclosed in U.S. Pat. No. 4,499,116 issued Feb. 12, 1985 to Zwiercan et al.

EXAMPLE I

This example describes the preparation of the diallylaminoethyl chloride monomer (II) used in the subsequent examples.

Diallylamine was reacted with ethylene oxide to give diallylaminoethanol and this was reacted with thionyl chloride to give an aqueous solution of diallylaminoethyl chloride in accordance with the method disclosed by J. B. Wright et al., *J. Amer. Chem. Soc.*, 72, pp. 3556–3559, 1950.

EXAMPLE II

This example describes the preparation of the graft copolymer of diallylaminoethyl chloride onto starch.

An allyl glycidyl ether derivatized starch was prepared as follows. A total of 100 parts of acid hydrolyzed waxy starch (water fluidity, WF-85) was slurried in an aqueous solution of 1.5 parts of sodium hydroxide and 25 parts of sodium sulfate in 150 parts water, then 0.2 parts of allyl glycidyl ether was added to the starch slurry. The mixture was agitated at 40° C. for 16 hours and the pH was lowered to 5.5 by adding 9.3% aqueous hydrochloric acid. The starch derivative was recovered by filtration, washed three times with water and air dried. This starch was designated starch "A".

A dispersion of starch "A" was prepared by cooking 50 parts of this starch in 180 parts of water for 20 minutes. The starch dispersion was added to a 250 ml four-neck round bottom flask, equipped with a mechanical stirrer, condenser, addition funnel and nitrogen gas inlet. A total of 6.6 parts of diallylaminoethyl chloride (hereinafter DAAEC) prepared in Example I and 50 parts of acrylamide were added to the starch dispersion and the aqueous mixture was adjusted to a pH of 4.5. An inverse emulsion of water-in-oil was formed by adding 110 parts of Isopar M (a branched-chain isoparaffinic oil obtained from Exxon Chemicals) and 33 parts of Tween 85 (polyoxyethylene sorbitan trioleate - surfactant) and stirring. The temperature was raised to 65°–70° C. under nitrogen gas and a thermal initiator, t-butyl peroxypivalate, was added in six equal portions (total of 0.2 ml diluted in 2 ml. of Isopar M) at thirty minute intervals. After holding the reaction for an additional three hours, it was quenched with five drops of a 1% solution of monomethyl ether hydroquinone in ethanol.

The prepared starch graft copolymer was precipitated into ethanol and washed with acetone to remove unreacted diallylaminoethyl chloride monomer and the oil phase. Chlorine analysis of the sample showed 0.80% ionic chlorine and 0.83% organic chlorine. The sample, identified as sample A, was later used in evaluating paper strength properties as described below.

Another graft copolymer identical to sample A was prepared in the same manner except that 13.2 parts of the DAAEC monomer was used. This sample, identified as sample B, showed 1.0% ionic chlorine and 1.25% organic chlorine. Sample B was also evaluated for paper dry and wet strength properties as described below.

EXAMPLE III

Graft copolymers similar to those described in Example II were prepared using a solution graft polymerization technique as follows:

A starch dispersion was prepared by cooking 50 parts of the allyl glycidyl ether derivatized starch from Example II, i.e., starch A in 180 parts of degased water for 20 minutes. The starch dispersion was added to a 250 ml four-neck round bottom flask, equipped with a mechanical stirrer, condenser, addition funnel and nitrogen inlet. A total of 6.6 parts of DAAEC prepared in Example I and 50 parts of acrylamide were added and the temperature raised to 65°–70° C. under nitrogen gas. An initiator solution of potassium persulfate (total of 0.1 g diluted to 2.0 g in degased water) was added in three portions, one hour apart. The reaction mixture was held for an additional three hours. The resulting mixture was acetone precipitated and washed to remove unreacted DAAEC monomer. This sample, identified as sample C, was evaluated for paper dry and wet strength applications as described below.

EXAMPLE IV

The prepared graft copolymers were evaluated for dry and wet paper tensile strength. The tensile strength is the maximum tensile stress developed in a test specimen before rupture on a tensile test carried to rupture under prescribed conditions. Tensile stress, as used here, is the force per unit width of the test specimen. Paper specimens were selected in accordance with TAPPI T 400 sampling procedures. Those evaluated for wet strength were saturated with distilled water by immersion and/or soaking until the paper sample was thoroughly wetted. The strength was evaluated in accordance with TAPPI T 494 om-82. The measurements were carried out using a constant rate of elongation apparatus, i.e., a Finch wet strength device, which is described in TAPPI Procdure T 456 om (1982). The dry strength was evaluated in accordance with TAPPI T 494 om 81.

Different graft copolymer samples A, B and C in solution were adjusted to pH values of 4.5 and 10.0and then evaluated for paper dry and wet strength using 10 lb./ton of pulp addition level. A control cationic treated waxy starch was also tested and reported for comparision.

The same samples were also tested at the 20 lb./ton additional level and all results are reported in Table I. The samples, particularly the emulsion prepared ones A and B, showed a small decay in strength of about 10–15%, nearly permanent strength.

TABLE 1

| SAMPLE | PARTS BY WEIGHT | | | | pH | ADDITION LEVEL (lb/ton) | TENSILE STRENGTH (g/in) | | |
| --- | --- | --- | --- | --- | --- | --- | --- | --- | --- |
| | STARCH | WATER | DAAEC | ACRYLAMIDE | | | DRY STRENGTH | WET STRENGTH | |
| | | | | | | | | 5 SECS. | 30 MINS. |
| A | 50 | 180 | 6.6 | 50 | 4.2 | 10 | 1572 | 236 | 212 |
| B | 50 | 180 | 13.2 | 50 | 4.5 | 10 | 1474 | 249 | 229 |
| A | 50 | 180 | 6.6 | 50 | 10.0 | 10 | 1527 | 212 | 204 |
| B | 50 | 180 | 13.2 | 50 | 10.0 | 10 | 1470 | 231 | 200 |
| Control | — | — | — | — | — | 10 | 1235 | 56 | 45 |
| C | 50 | 180 | 6.6 | 50 | 4.5 | 10 | 1188 | 56 | 44 |
| C | 50 | 180 | 6.6 | 50 | 10.0 | 10 | 1169 | 54 | 42 |
| A | 50 | 180 | 6.6 | 50 | 4.2 | 20 | 1808 | 372 | 317 |

TABLE 1-continued

| SAMPLE | PARTS BY WEIGHT | | | | pH | ADDITION LEVEL (lb/ton) | TENSILE STRENGTH (g/in) | | |
| --- | --- | --- | --- | --- | --- | --- | --- | --- | --- |
| | STARCH | WATER | DAAEC | ACRYLAMIDE | | | DRY STRENGTH | WET STRENGTH | |
| | | | | | | | | 5 SECS. | 30 MINS. |
| B | 50 | 180 | 13.2 | 50 | 4.5 | 20 | 1634 | 311 | 281 |
| A | 50 | 180 | 6.6 | 50 | 10.0 | 20 | 1871 | 338 | 292 |
| B | 50 | 180 | 13.2 | 50 | 10.0 | 20 | 1758 | 312 | 288 |
| Control | — | — | — | — | — | 20 | 1525 | 65 | 46 |
| C | 50 | 180 | 6.6 | 50 | 4.5 | 20 | 1318 | 72 | 69 |
| C | 50 | 180 | 6.6 | 50 | 10.0 | 20 | 1262 | 77 | 54 |

EXAMPLE V

Graft copolymer sample A was evaluated for paper strength, as described above, at different addition levels with results reported in Table 2. Comparision was made with Kymene 557, a commercial paper strength additive. The Kymene sample gave about the same paper strength at all addition levels, while the graft copolymer, sample A, gave comparable dry strength at the 5 and 10 lb./ton addition level but continued to increase at higher addition levels. While the paper wet strength at the low addition levels, was lower for graft copolymer A than with Kymene, at about 30 lbs./ton it was nearly the same and continued to increase and was greater at the higher addition levels.

EXAMPLE VI

Graft copolymers were prepared in the identical procedure described in Example II except that lower amounts of the DAAEC monomer were used. Sample D used 4.9 parts and sample E used 3.3 parts of the monomer. The samples were tested for paper strength as described above with results still showing the graft copolymers to be effective in these paper strength applications as reported in Table 3.

TABLE 3

| SAMPLE | PARTS BY WEIGHT | | | | pH | ADDITION LEVEL (lb/ton) | TENSILE STRENGTH (g/in) | | |
| --- | --- | --- | --- | --- | --- | --- | --- | --- | --- |
| | STARCH | WATER | DAAEC | ACRYLAMIDE | | | DRY STRENGTH | WET STRENGTH | |
| | | | | | | | | 5 SECS. | 30 MINS. |
| Control | — | — | — | — | — | 10 | 1235 | 56 | 45 |
| D | 50 | 180 | 4.9 | 50 | 4.5 | 10 | 1802 | 263 | 243 |
| D | 50 | 180 | 4.9 | 50 | 10.0 | 10 | 1861 | 264 | 230 |
| E | 50 | 180 | 3.3 | 50 | 4.5 | 10 | 1749 | 249 | 175 |
| E | 50 | 180 | 3.3 | 50 | 10.0 | 10 | 1728 | 226 | 175 |
| Control | — | — | — | — | — | 20 | 1525 | 65 | 46 |
| D | 50 | 180 | 4.9 | 50 | 4.5 | 20 | 1960 | 348 | 290 |
| D | 50 | 180 | 4.9 | 50 | 10.0 | 20 | 2017 | 329 | 274 |
| E | 50 | 180 | 3.3 | 50 | 4.5 | 20 | 1802 | 278 | 231 |
| E | 50 | 180 | 3.3 | 50 | 10.0 | 20 | 1937 | 267 | 218 |

EXAMPLE VII

Graft copolymers were prepared in the same manner as described in Example II, but with higher molecular weight starch samples, WF-64 for sample F and WF-70 for sample G. The paper strength results are reported in Table 4 and show comparable results to the lower molecular weight starch samples A and B.

TABLE 2

| SAMPLE | pH | STRENGTH (g/in) | ADDITION LEVEL (LB./TON) | | | | | | | |
| --- | --- | --- | --- | --- | --- | --- | --- | --- | --- | --- |
| | | | 5 | 10 | 20 | 40 | 80 | 100 | 200 | 400 |
| Kymene | — | Dry | 1642 | 1633 | 1720 | 1743 | 1644 | 1477 | 1693 | 1598 |
| A | 4.6 | Dry | 1560 | 1711 | 2212 | 2628 | 2717 | 3048 | 3363 | 3439 |
| A | 10.0 | Dry | 1654 | 1672 | 2013 | 2412 | 2776 | 2999 | 3518 | 3835 |
| Kymene | — | Wet - 5 sec. | 405 | 494 | 403 | 439 | 426 | 464 | 526 | 416 |
| A | 4.6 | Wet - 5 sec. | 184 | 292 | 360 | 515 | 574 | 675 | 684 | 728 |
| A | 10.0 | Wet - 5 sec. | 202 | 255 | 339 | 456 | 617 | 565 | 638 | 698 |
| Kymene | — | Wet - 30 min. | 372 | 381 | 400 | 397 | 385 | 397 | 420 | 355 |
| A | 4.6 | Wet - 30 min. | 141 | 258 | 341 | 438 | 588 | 602 | 600 | 632 |
| A | 10.0 | Wet - 30 min. | 135 | 232 | 310 | 414 | 514 | 510 | 637 | 602 |

TABLE 4

| SAMPLE | PARTS BY WEIGHT | | | | | pH | ADDITION LEVEL (lb/ton) | TENSILE STRENGTH (g/in) | | |
| --- | --- | --- | --- | --- | --- | --- | --- | --- | --- | --- |
| | STARCH TYPE | STARCH PARTS | WATER | DAAEC | ACRYLAMIDE | | | DRY | WET STRENGTH | |
| | | | | | | | | | 5 SECS. | 30 MINS. |
| F | WF-64 | 50 | 180 | 6.6 | 50 | 4.2 | 10 | 1392 | 232 | 181 |
| F | WF-64 | 50 | 180 | 6.6 | 50 | 9.9 | 10 | 1502 | 204 | 146 |
| G | WF-70 | 50 | 180 | 6.6 | 50 | 4.5 | 10 | 1567 | 258 | 242 |
| G | WF-70 | 50 | 180 | 6.6 | 50 | 10.0 | 10 | 1568 | 247 | 198 |
| Control | — | — | — | — | — | — | 10 | 1235 | 56 | 45 |
| F | WF-64 | 50 | 180 | 6.6 | 50 | 4.2 | 20 | 1747 | 353 | 261 |
| F | WF-64 | 50 | 180 | 6.6 | 50 | 9.9 | 20 | 1713 | 275 | 242 |
| G | WF-70 | 50 | 180 | 6.6 | 50 | 4.5 | 20 | 1916 | 346 | 316 |

TABLE 4-continued

| SAMPLE | STARCH TYPE | STARCH PARTS | WATER | DAAEC | ACRYLAMIDE | pH | ADDITION LEVEL (lb/ton) | TENSILE STRENGTH (g/in) | | |
|---|---|---|---|---|---|---|---|---|---|---|
| | | | | | | | | DRY | WET STRENGTH | |
| | | | | | | | | | 5 SECS. | 30 MINS. |
| G | WF-70 | 50 | 180 | 6.6 | 50 | 10.0 | 20 | 2023 | 307 | 272 |
| Control | — | — | — | — | — | — | 20 | 1525 | 65 | 46 |

EXAMPLE VIII

Graft copolymers as in Example II were prepared using different starch/acrylamide ratios, 60/40, sample H and 70/30, sample I. Sample H contained 0.79% organic chlorine and 0.78% ionic chlorine and Sample I contained 0.60% organic chlorine and 0.68 ionic chlorine.

Paper strength tests, made as described above, are reported in Table 5 and both samples show better wet strength properties than the control.

TABLE 5

| SAMPLE | STARCH | WATER | DAAEC | ACRYLAMIDE | pH | ADDITION LEVEL (lb/ton) | TENSILE STRENGTH (g/in) | | |
|---|---|---|---|---|---|---|---|---|---|
| | | | | | | | DRY | WET STRENGTH | |
| | | | | | | | | 5 SECS. | 30 MINS. |
| Control | — | — | — | — | — | 10 | 1235 | 56 | 45 |
| H | 60 | 220 | 6.6 | 40 | 4.5 | 10 | 1391 | 202 | 182 |
| H | 60 | 220 | 6.6 | 40 | 10.0 | 10 | 1344 | 210 | 188 |
| I | 70 | 260 | 6.6 | 30 | 4.5 | 10 | 867 | 101 | 86 |
| I | 70 | 260 | 6.6 | 30 | 10.0 | 10 | 869 | 107 | 82 |
| Control | — | — | — | — | — | 20 | 1525 | 65 | 46 |
| H | 60 | 220 | 6.6 | 40 | 4.5 | 20 | 1360 | 293 | 282 |
| H | 60 | 220 | 6.6 | 40 | 10.0 | 20 | 1255 | 217 | 193 |
| I | 70 | 260 | 6.6 | 30 | 4.5 | 20 | 1067 | 160 | 129 |
| I | 70 | 260 | 6.6 | 30 | 10.0 | 20 | 1128 | 160 | 141 |

EXAMPLE IX

Graft copolymers were prepared in the same manner as described in Example II but using an acid hydrolyzed starch (water fluidity WF-85) which was derivatized with diethylamonium chlordie (3.25%), hereinafter DEC, and further treated with alkyl glycidyl either (0.2%, sample J or 0.5 %, sample K). Fifty parts of this cationic starch and a similar one derivatized with 3-chloro-2-hydroxypropyl trimethylammonium chloride (4%), hereinafter QUAT, and allyl glycidyl ether (0.2%), samples L and M, were grafted with 6.6 parts of DAAEC monomer (samples J, K and L) or 13.2 parts of DAAEC monomer (sample M) and 50 parts of acrylamide.

The different graft copolymer samples J, K, L and M in solution were adjusted to pH values of 4.5 and 10.0 and then evaluated for paper dry and wet strength using 10 and 20 lb./ton of pulp addition levels. A control cationic treated corn starch was also tested and reported for comparison with all results reported in Table 6. The samples all show an increase in paper dry and wet strengths over the control and generally show better results than the base graft copolymer of Example II, Table I, particularly with respect to wet strength.

TABLE 6

| SAMPLE | STARCH | WATER | DAAEC | ACRYLAMIDE | pH | ADDITION LEVEL (lb/ton) | TENSILE STRENGTH (g/in) | | |
|---|---|---|---|---|---|---|---|---|---|
| | | | | | | | DRY | WET STRENGTH | |
| | | | | | | | | 5 SECS. | 30 MINS. |
| Control | — | — | — | — | — | 10 | 1091 | 35 | 18 |
| J | 50(1) | 180 | 6.6 | 50 | 4.5 | 10 | 1614 | 314 | 257 |
| J | 50(1) | 180 | 6.6 | 50 | 10.0 | 10 | 1657 | 279 | 268 |
| K | 50(2) | 180 | 6.6 | 50 | 4.5 | 10 | 1520 | 251 | 221 |
| K | 50(2) | 180 | 6.6 | 50 | 10.0 | 10 | 1588 | 256 | 228 |
| L | 50(3) | 180 | 6.6 | 50 | 4.5 | 10 | 1721 | 294 | 254 |
| L | 50(3) | 180 | 6.6 | 50 | 10.0 | 10 | 1695 | 293 | 251 |
| M | 50(3) | 180 | 13.2 | 50 | 4.5 | 10 | 1749 | 354 | 277 |
| M | 50(3) | 180 | 13.2 | 50 | 10.0 | 10 | 1797 | 326 | 259 |
| Control | — | — | — | — | — | 20 | 1546 | 46 | 30 |
| J | 50(1) | 180 | 6.6 | 50 | 4.5 | 20 | 1763 | 393 | 373 |
| J | 50(1) | 180 | 6.6 | 50 | 10.0 | 20 | 1763 | 421 | 386 |
| K | 50(2) | 180 | 6.6 | 50 | 4.5 | 20 | 1738 | 335 | 302 |
| K | 50(2) | 180 | 6.6 | 50 | 10.0 | 20 | 1758 | 326 | 308 |
| L | 50(3) | 180 | 6.6 | 50 | 4.5 | 20 | 1763 | 399 | 368 |
| L | 50(3) | 180 | 6.6 | 50 | 10.0 | 20 | 1766 | 430 | 399 |
| M | 50(3) | 180 | 13.2 | 50 | 4.5 | 20 | 1764 | 506 | 411 |
| M | 50(3) | 180 | 13.2 | 50 | 10.0 | 20 | 1766 | 430 | 375 |

(1) allyl glycidyl ether (0.2%), DEC-85 WF starch
(2) allyl glycidyl ether (0.5%), DEC-85 WF starch
(3) allyl glycidyl ether (0.2%), QUAT-85 WF starch

What is claimed is:
1. A graft copolymer represented as:

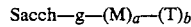

where Sacch is a polysaccharide base substrate, g indicates a graft chain on the substrate, M is a repeating unit derived from a monomer having the formula:

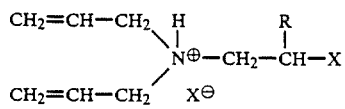

where X is a halogen and R is hydrogen or an alkyl group of 1 to 2 carbon atoms, T is a repeating unit of an ethylenically unsaturated comonomer, a is at least 1, and b is 0 or 1 or more, and wherein there is from about 1 to 99% of said polysaccharide, about 99 to 1% of said monomer, and about 0 to 95% of said comonomer, all % by weight based on the weight of the final graft copolymer.

2. The graft copolymer of claim 1 where X is chlorine.

3. The graft copolymer of claim 2 where R is hydrogen or methyl.

4. The graft copolymer of claim 3 where the polysaccharide base is starch.

5. The graft copolymer of claim 4 where R is hydrogen.

6. The graft copolymer of claim 5 wherein T is acrylamide.

7. The method of preparing a polysaccharide graft copolymer by reacting a polysaccharide substrate for the graft and a monomomer having a reactive aminoethyl halide group that is introduced into the graft polymer and having the formula:

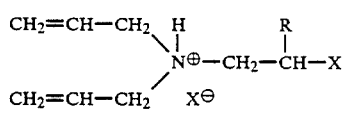

where X is a halogen and R is hydrogen or an alkyl group of 1 to carbon atoms,
in the presence of a free radical catalyst while maintaining the system at a pH of below 7 to prevent premature reaction of the halide in the aminoethyl halide group.

8. The method of claim 7 wherein an ethylenically unsaturated comonomer is included in the polymerization reaction.

9. The method of claim 8 wherein the pH of the system is about 1 to 6.

10. The method of claim 9 wherein X is chlorine and R is hydrogen.

11. The method of claim 10 wherein the polysaccharide substrate is starch.

12. The method of claim 11 wherein the polymerization involves an inverse emulsion.

13. The method of claim 11 wherein the comonomer is acrylamide.

14. The method of claim 13 wherein the pH of the system is about 2 to 5.

15. The method of claim 14 wherein from about 1 to 99% or said polysaccharide, about 99 to 1% of said monomer, and about 0 to 95% of said comonomer, all % by weight based on the weight of the final graft polymer, are used.

16. The method of claim 15 wherein about 5 to 95% of said polysaccharide and about 50 to 2% of said monomer, all % by weight based on the weight of the final graft copolymer, are used.

17. The method of claim 16 wherein from about 0 to 50% of said comonomer by weight based on the weight of the final graft copolymer is used.

18. The method of claim 17 wherein said comonomer is acrylamide.

19. In a method of making paper having dry strength, wet strength, or combinations thereof, the step which comprises adding as a strength aid, to the stock at any stage prior to forming a web, an effective amount of the polysaccharide graft copolymer of claim 1.

20. The method of claim 19 using a polysaccharide graft copolymer wherein X is chlorine, R is hydrogen and the polysaccharide base is starch.

21. The method of claim 20 wherein the polysaccharide graft copolymer has acrylamide as comonomer.

22. The graft copolymer of claim 4 wherein there is from about 5 to 95% of said polysaccharide base, from about 50 to 2% of said monomer and from about 0 to 50% of said comonomer, all % by weight based on the weight of the final graft copolymer.

* * * * *